W. P. THOMSON.
INSULATED RAIL JOINT.
APPLICATION FILED JUNE 13, 1918.
1,314,768.
Patented Sept. 2, 1919.
2 SHEETS—SHEET 1.
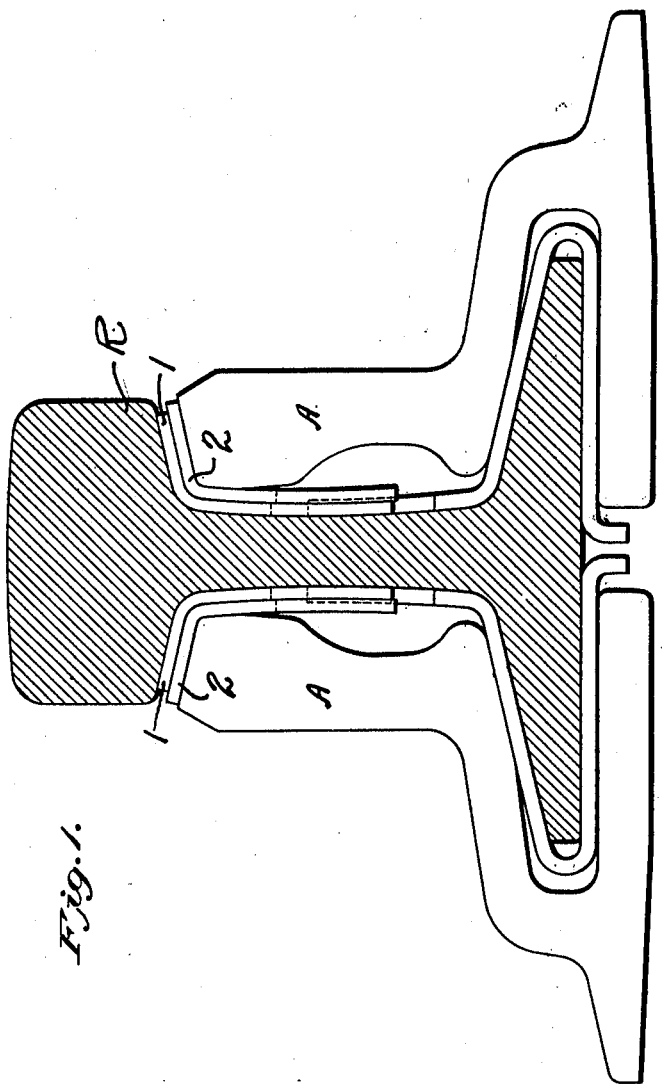
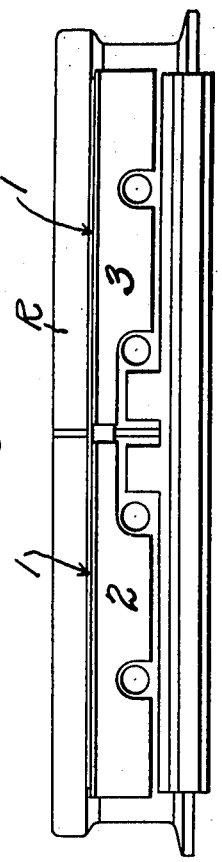
Inventor
WILLIAM P. THOMSON
By

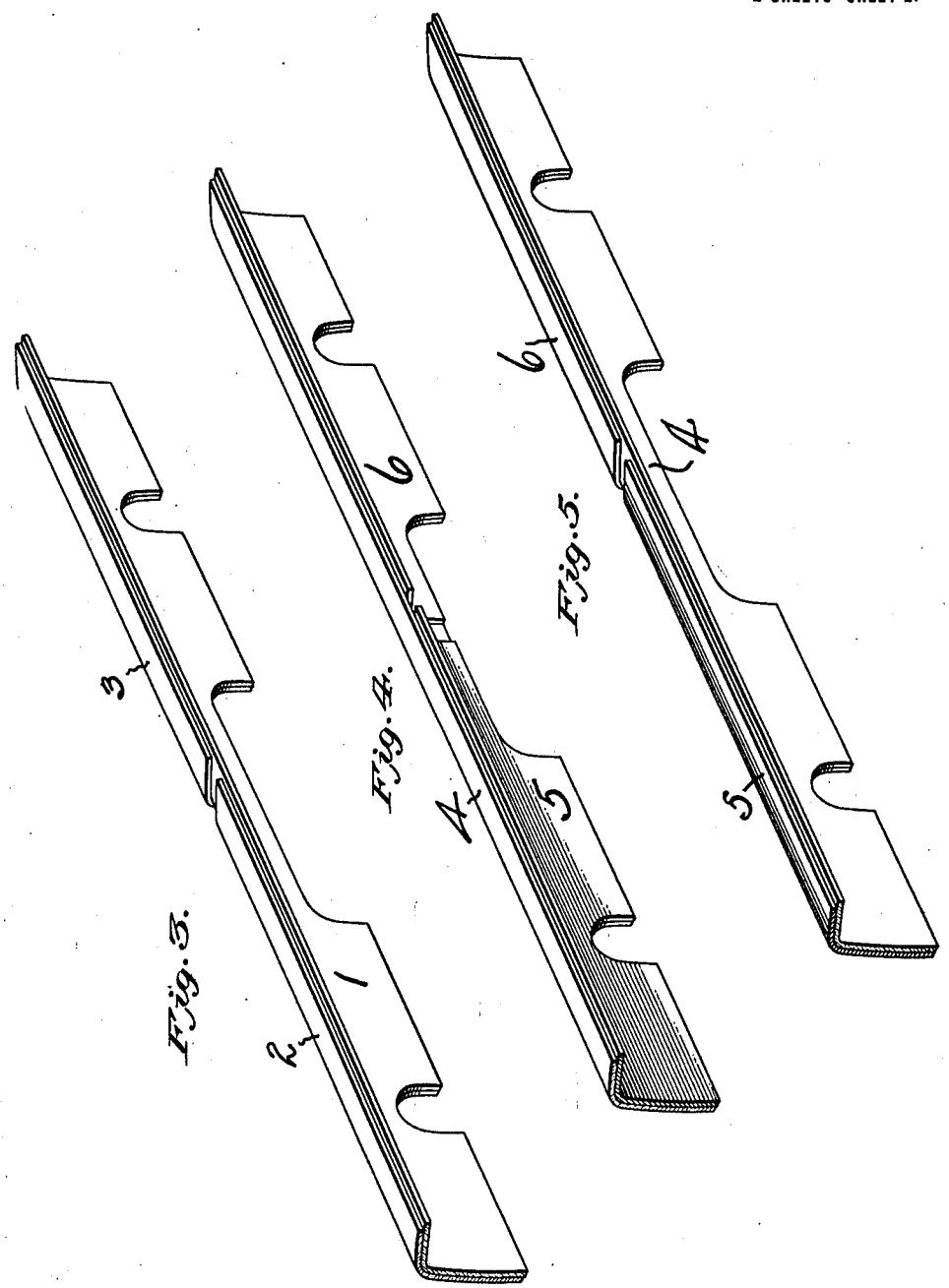

UNITED STATES PATENT OFFICE.

WILLIAM PATON THOMSON, OF NEW YORK, N. Y., ASSIGNOR TO THE RAIL JOINT COMPANY, OF NEW YORK, N. Y., A CORPORATION OF NEW YORK.

INSULATED RAIL-JOINT.

1,314,768.     Specification of Letters Patent.     Patented Sept. 2, 1919.

Application filed June 13, 1918. Serial No. 239,782.

*To all whom it may concern:*

Be it known that I, WILLIAM PATON THOMSON, citizen of the United States, residing at New York city, in the county of New York and State of New York, have invented certain new and useful Improvements in Insulated Rail-Joints, of which the following is a specification.

This invention relates to rail joints, and more particularly to an improvement in the insulation for joints of the insulated type.

To this end, the invention contemplates a novel insulating unit adapted for use between the under side of the rail head and the upper side of the joint bar, and of such construction as to provide a greater range of interchangeability and adjustment than possible with the insulation now generally in use.

In insulated rail joints, the insulation between the head of the bar and the under side of the rail head, is the first to wear out or become ruptured, this being primarily due to the fact that the weight of the superposed load tends to cause the head insulation to be crushed or shredded because of the relative movement between the joint bar and the rail, and this effect on the insulation is concentrated and more pronounced beneath the head of the receiving rail. Also, under service conditions in track, the so-called head insulation is subjected to a severe chafing action by reason of being confined between two hard metal surfaces having at times a relative movement in opposite directions; aside from the condition that the portion of the insulation disposed beneath the head of the rail which receives the load is subjected to a greater strain than that disposed beneath the head of the leaving rail.

Accordingly, the present invention has primarily in view a head insulating unit of multiple or divided formation and properly designed constituent parts which will permit of a relative slipping or yielding between the parts under actual service conditions, and also permit of being readily shifted about or interchanged with respect to other parts of the unit to materially prolong the life of the entire insulation.

With the foregoing, and other objects in view which will be more readily apparent as the nature of the invention is better understood, reference may be made to the accompanying drawings which illustrate practical and preferred embodiments of the invention, and in which:—

Figure 1 is an end elevation of an insulated rail joint showing the improved insulating unit installed between the under side of the rail head and the upper side of the joint bars.

Fig. 2 is a side elevation of the joint with one of the joint bars removed.

Fig. 3 is a detail perspective view of the improved head insulating unit showing a full length insulating piece adapted to contact with the head of the joint bar while separate shorter lengths are adapted to lie between the same and the under side of the rail head, this type of unit being a reversal of that shown by Figs. 1 and 2 of the drawings.

Figs. 4 and 5 are perspective views showing other modifications of the invention, to exemplify the range of interchangeability of the fiber and metal parts.

Similar reference numerals designate corresponding parts throughout the several figures of the drawings.

One of the distinctive features of the present invention is the formation of the several parts of the insulating unit in such a manner that they may be readily interchanged to bring relatively fresh unworn parts into the place of those which are more or less worn, or else substitute an entirely new and yet relatively small section in place of the one which has broken down. Accordingly, to this end, it is proposed to provide an insulating unit of the so-called "divided" insulating type which includes a plurality of relatively interchangeable parts, one of which is preferably of full length, that is, adapted to extend substantially the full length of the joint, while the complemental part consists of separate and independently removable members or sections which permit of forming various combinations with the relatively long section to obtain the desired range of interchangeability.

One practical and efficient combination of the essential elements above set forth is shown in Figs. 1 and 2 of the drawings wherein it will be observed that the insulation interposed between the upper side of the joint bar A and the underside of the rail head consists of a full length fiber section 1 adapted to contact with the under side of the rail head, while coöperating therewith to fill the entire space between the rail head and head of the joint bar, are the separate relatively short sections of insulation 2 and 3. In this combination, all of the advantages of the so-called divided insulation, including the lubricious characteristic manifested by the loose contacting of the superposed sections of fiber, are preserved, with the added advantage of being able to remove any one of the parts which shows more signs of wear than the other to a point where it would be subject to less wear. By reason of this construction, a decided advantage in the up-keep and maintenance of the head insulation of the joint is obtained, since, as previously indicated, the greatest wear on the insulation takes place beneath the head of the receiving rail, and the section of insulation which is thus subjected to the greatest wear may be readily removed when desired and shifted to a point where it will still further perform its function but not be subjected to the strains incident to service in its former location.

To illustrate the interchangeability of the several parts of the unit there is shown in Fig. 3 of the drawings, an arrangement of the insulation plates, wherein the continuous section of insulation 1 may be located in the joint so that it will bear directly against the head of the bar, while the separate shorter sections 2 and 3 may be superimposed thereon to contact directly with the under side of the rail head. This reversal of the relation to the several parts of the unit has the obvious advantage of bringing new and relatively fresh parts into new locations in the reassembling of the joint, and under some circumstances may constitute a practical and efficient initial installation.

As further illustrating the range and scope of the novel features of the invention, further combinations are suggested in Figs. 4 and 5 of the drawings, wherein it will be observed that it is proposed to combine the continuous section of insulation 4 with relatively short sections 5 and 6 that are respectively metal and insulation. That is to say, in the combinations suggested in these figures, it is proposed to utilize a relatively short metallic section in place of one of the fiber sections in the combinations set forth in Figs. 1 to 3, whereby the metallic section may be readily utilized beneath the head of one of the rails to enable the insulation to be disposed to best withstand the pounding effect of the passing wheel loads. Obviously, the sections 4, 5 and 6 are susceptible of various combinations, such as that shown in Fig. 4, wherein the full length section of insulation contacts directly with the under side of the rail head, while the relatively short sections of metal and insulation contact with the head of the joint bar, or as shown in Fig. 5, the reverse of this combination may be successfully utilized.

From the foregoing, it will be apparent that one of the novel and distinctive features of the present invention is the provision of a head insulating unit of the divided insulation type which consists of a plurality of relatively interchangeable and shiftable parts, which not only facilitate renewals and repairs but also materially increase the life of the insulation, since the several parts may be shifted with relation to each other to bring relatively fresh parts thereof into position where they will relieve those parts which are worn.

I claim:

1. A head unit of insulation for rail joints consisting of a joint length plate, and a pair of separate shorter plates interchangeable in position therewith, the said plates being arranged in superimposed relation.

2. A head unit of insulation for rail joints consisting of a plurality of superimposed plates interchangeable in position for engagement either with the rail head or the splice bar.

3. A head unit of insulation for rail joints consisting of a plurality of superimposed plates interchangeable in position for engagement respectively with either the rail head or the joint bar, one of said plates being substantially coextensive in length with the rail joint.

4. A head unit of insulation for rail joints consisting of a single full length fiber plate and a pair of half length plates respectively of insulation and metal, the said several plates being superimposed and interchangeable in position to respectively engage either the rail head or joint bar head.

In testimony whereof I hereunto affix my signature in the presence of two witnesses.

WILLIAM PATON THOMSON.

Witnesses:
 E. K. KERSHNER,
 C. A. DISBROW.

Copies of this patent may be obtained for five cents each, by addressing the "Commissioner of Patents, Washington, D. C."